(12) United States Patent
Kim et al.

(10) Patent No.: US 12,703,429 B2
(45) Date of Patent: Aug. 11, 2026

(54) VEHICLE FRONT SUBFRAME

(71) Applicants: HYUNDAI MOTOR COMPANY, Seoul (KR); KIA CORPORATION, Seoul (KR)

(72) Inventors: Chang Kyu Kim, Hwaseong-si (KR); Il Hun Park, Hwaseong-si (KR); Byung Joo Chung, Gunpo-si (KR); Seung Hak Lee, Anyang-si (KR); Won Hae Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 400 days.

(21) Appl. No.: 18/385,151

(22) Filed: Oct. 30, 2023

(65) Prior Publication Data

US 2025/0074512 A1 Mar. 6, 2025

(30) Foreign Application Priority Data

Aug. 30, 2023 (KR) ........................ 10-2023-0114930

(51) Int. Cl.

| | |
|---|---|
| ***B62D 21/15*** | (2006.01) |
| ***B62D 21/11*** | (2006.01) |
| ***B62D 27/02*** | (2006.01) |
| ***B62D 27/06*** | (2006.01) |

(52) U.S. Cl.

CPC ............ *B62D 21/155* (2013.01); *B62D 21/11* (2013.01); *B62D 27/023* (2013.01); *B62D 27/065* (2013.01)

(58) Field of Classification Search

CPC .... B62D 21/155; B62D 21/15; B62D 21/152; B62D 21/11; B62D 21/02; B62D 21/09; B62D 27/023; B62D 27/065; B62D 27/02; B60Y 2306/01

USPC .................. 296/187.09, 203.02, 193.09, 204

See application file for complete search history.

(56) References Cited

U.S. PATENT DOCUMENTS

| | | | | |
|---|---|---|---|---|
| 11,459,033 | B2 * | 10/2022 | Atsumi | B60R 19/34 |
| 2002/0033594 | A1 * | 3/2002 | Yamamoto | B62D 27/02 280/781 |
| 2014/0110925 | A1 * | 4/2014 | Goellner | B62D 21/155 280/781 |
| 2019/0300059 | A1 * | 10/2019 | Komiya | B62D 21/00 |

FOREIGN PATENT DOCUMENTS

| | | | | |
|---|---|---|---|---|
| DE | 112014005658 T5 | * | 8/2016 | B62D 21/11 |

* cited by examiner

*Primary Examiner* — Amy R Weisberg
*Assistant Examiner* — Denise L. Esquivel
(74) *Attorney, Agent, or Firm* — Lempia Summerfield Katz LLC

(57) ABSTRACT

A vehicle front subframe includes: a pair of longitudinal members each extending in a longitudinal direction of a vehicle and having a mounting recess; an inner reinforcing member mounted in an inner cavity of each longitudinal member; and a suspension arm having a mount mounted in the mounting recess of each longitudinal member through a mount member.

13 Claims, 14 Drawing Sheets

VEHICLE FRONT SUBFRAME

CROSS-REFERENCE TO RELATED APPLICATION

This application is based on and claims the benefit of priority to Korean Patent Application No. 10-2023-0114930, filed on Aug. 30, 2023, in the Korean Intellectual Property Office, the disclosure of which is incorporated herein in its entirety by reference.

TECHNICAL FIELD

The present disclosure relates to a vehicle front subframe. More particularly, the present disclosure relates to a vehicle front subframe designed to minimize or suppress the buckling of the front subframe in the event of a frontal impact/collision, thereby effectively transferring impact energy to rear mounts of the front subframe.

BACKGROUND

In general, a vehicle may include a front subframe mounted on a vehicle body. The front subframe may support an engine, a transmission, a suspension, and the like. The front subframe may serve to facilitate the transfer of impact energy while ensuring structural stiffness of the vehicle.

The front subframe may also include a pair of longitudinal members extending in a longitudinal or lengthwise direction of the vehicle, and a pair of transversal members connecting the pair of longitudinal members in a latitudinal or width direction of the vehicle. Due to the layout of the front subframe and various peripheral components/parts (suspension components, electric/electronic components, and the like), each longitudinal member of the front subframe may have a reduced cross section formed on a portion thereof. The reduced cross section means a reduction in cross-sectional area compared to the other portion(s) of the longitudinal member. When impact energy is transferred to the front subframe, the longitudinal members of the front subframe may buckle at the reduced cross section.

In the event of a frontal impact/collision of the vehicle, the front subframe needs to be separated from the vehicle body to ensure the safety of the passenger compartment. In a condition in which the ground clearance (distance between a bumper and the ground) of the vehicle is relatively low (for example, 150 mm), the front subframe may buckle due to impact energy generated in the event of a frontal impact/collision of the vehicle. As the buckled portion of the front subframe comes into contact with the ground, impact energy may be additionally generated. As the impact energy is sufficiently transferred to rear mounts of the front subframe, the rear mounts of the front subframe may be separated from the vehicle body. Accordingly, the front subframe may be prevented from intruding into the passenger compartment.

However, in a condition in which the ground clearance of the vehicle is relatively high (for example, 200 mm), the front subframe may excessively buckle due to impact energy generated in the event of a frontal impact/collision of the vehicle. Accordingly, the impact energy may not be efficiently transferred to the rear mounts of the front subframe. As a result, the rear mounts of the front subframe may not be completely separated from the vehicle body. As the impact energy generated in the event of a frontal impact/collision of the vehicle is consumed in the buckling of the front subframe, the front subframe may not be separated from the vehicle body if the impact energy is not efficiently transferred to the rear mounts of the front subframe.

The above information described in this Background section is provided to assist in understanding the background of the inventive concept. Therefore, the Background section may include technical concept that is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a vehicle front subframe designed to suppress the buckling of the front subframe in the event of a frontal impact/collision, thereby effectively transferring impact energy to the rear mounts of the front subframe.

According to an aspect of the present disclosure, a vehicle front subframe may include a pair of longitudinal members each extending in a longitudinal direction of a vehicle and having a mounting recess. The subframe may also include an inner reinforcing member mounted in an inner cavity of each longitudinal member. Additionally, the subframe may include a suspension arm having a mount mounted in the mounting recess of each longitudinal member through a mount member.

The inner reinforcing member may extend from the mounting recess toward the front of the longitudinal member. The inner reinforcing member may be fixed to the longitudinal member together with the mount member through a fastener.

The inner reinforcing member may include an upper wall, a lower wall spaced apart from the upper wall, a flange extending along an edge of the upper wall, and a connection wall connecting the upper wall and the lower wall.

The longitudinal member may include an upper channel and a lower channel coupled to the upper channel. The inner cavity may be defined by the upper channel and the lower channel.

The flange may be fixed to a lateral wall of the upper channel by welding, and the lower wall may be fixed to a bottom wall of the lower channel by welding.

The vehicle front subframe may further include an outer reinforcing member fixed to an exterior surface of the longitudinal member and aligned with at least a portion of the inner reinforcing member.

The outer reinforcing member may be configured to connect the longitudinal member and the mount member.

The outer reinforcing member may include a front portion and a rear portion located behind the front portion.

The outer reinforcing member may have a bent portion bent at at least one edge thereof.

The front portion of the outer reinforcing member may be fixed to the longitudinal member together with the inner reinforcing member through a first front bolt and a first front nut.

A top surface of the first front nut may contact the longitudinal member.

A top surface of the first front nut may contact an upper portion of the longitudinal member. A lower portion of the first front nut may extend through a through hole of the inner reinforcing member.

The rear portion of the outer reinforcing member may be fixed to the longitudinal member together with the mount member and the inner reinforcing member through a second front bolt and a second front nut.

A top surface of the second front nut may contact an upper portion of the longitudinal member. A lower portion of the second front nut may extend through a through hole of the inner reinforcing member and a through hole of the bottom of the longitudinal member.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
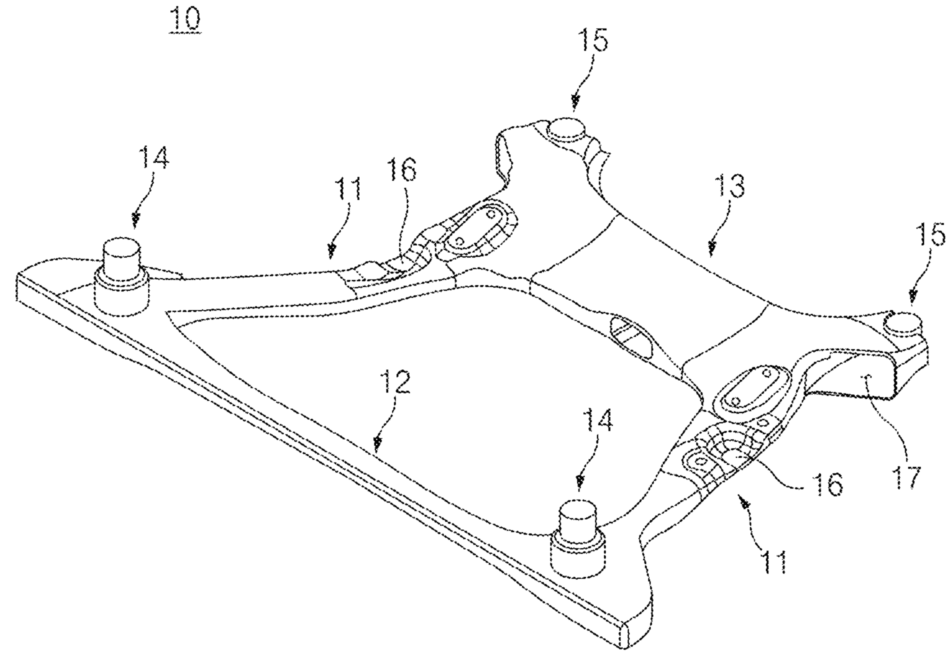
FIG. 1 illustrates a perspective view of a vehicle front subframe according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been ruled out in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings consistent with the contextual meanings in the relevant field of art. These terms are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Referring to FIG. 1, a vehicle front subframe 10 may have a front end portion facing the front of the vehicle and a rear end portion facing the rear of the vehicle. The front subframe 10 may include a pair of front mounts 14 provided at the front end portion thereof. The front subframe 10 may also include a pair of rear mounts 15 provided at the rear end portion thereof. The front subframe 10 may be mounted on a front structure of a vehicle body through the pair of front mounts 14 and the pair of rear mounts 15.

Referring to FIG. 1, the vehicle front subframe 10 according to an embodiment of the present disclosure may include a pair of longitudinal members 11 and a front transversal member 12 extending transverse to front ends of the pair of longitudinal members 11. The vehicle front subframe 10 may also include a rear transversal member 13 extending transverse to rear ends of the pair of longitudinal members 11.

Each longitudinal member 11 may extend in a longitudinal direction of the vehicle. The pair of longitudinal members 11 may be spaced apart from each other in a width direction of the vehicle. Each longitudinal member 11 may have a mounting recess 16 formed in a middle portion thereof and a mounting cavity 17 formed in a rear portion thereof. The longitudinal member 11 may be inclined at a predetermined angle from the mounting recess 16 toward the front of the vehicle. The mounting recess 16 may be recessed from a top surface of the longitudinal member 11 toward a bottom surface of the longitudinal member 11.

The front transversal member 12 may extend in the width direction of the vehicle. The front transversal member 12 may connect the front ends of the pair of longitudinal members 11 along the width direction of the vehicle.

The rear transversal member 13 may also extend in the width direction of the vehicle. The rear transversal member 13 may connect the rear ends of the pair of longitudinal members 11 along the width direction of the vehicle.

Figure 2:
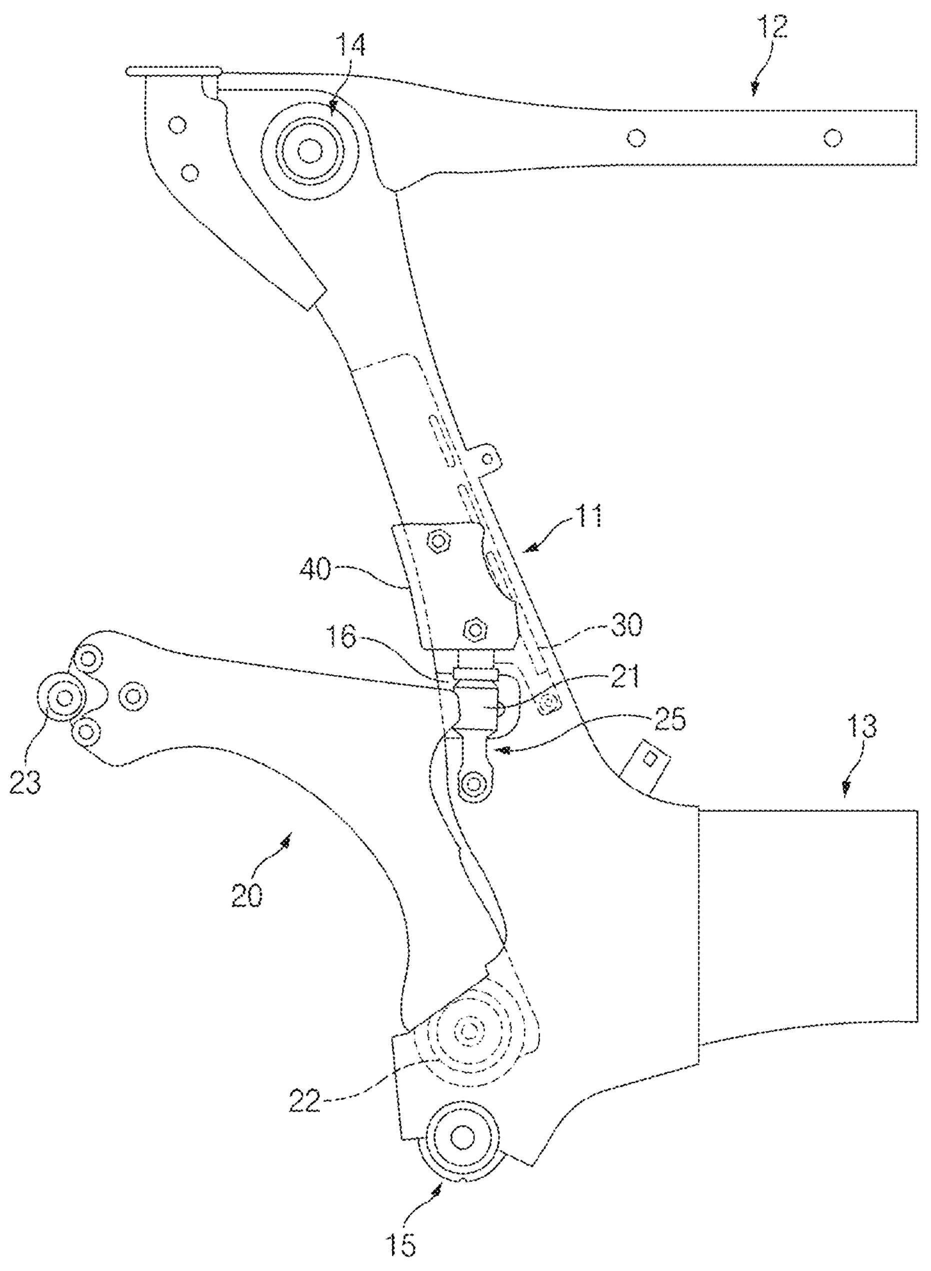
FIG. 2 illustrates a plan view of half of a vehicle front subframe according to an embodiment of the present disclosure.

Referring to FIG. 2, a suspension arm 20 may be connected to the longitudinal member 11. The suspension arm 20 may include a first mount 21 mounted in the mounting recess 16 of the longitudinal member 11, a second mount 22 mounted in the mounting cavity 17 of the longitudinal member 11, and a third mount 23 mounted on a wheel (not shown). According to an embodiment, the suspension arm 20 may be a lower control arm.

Figure 3:
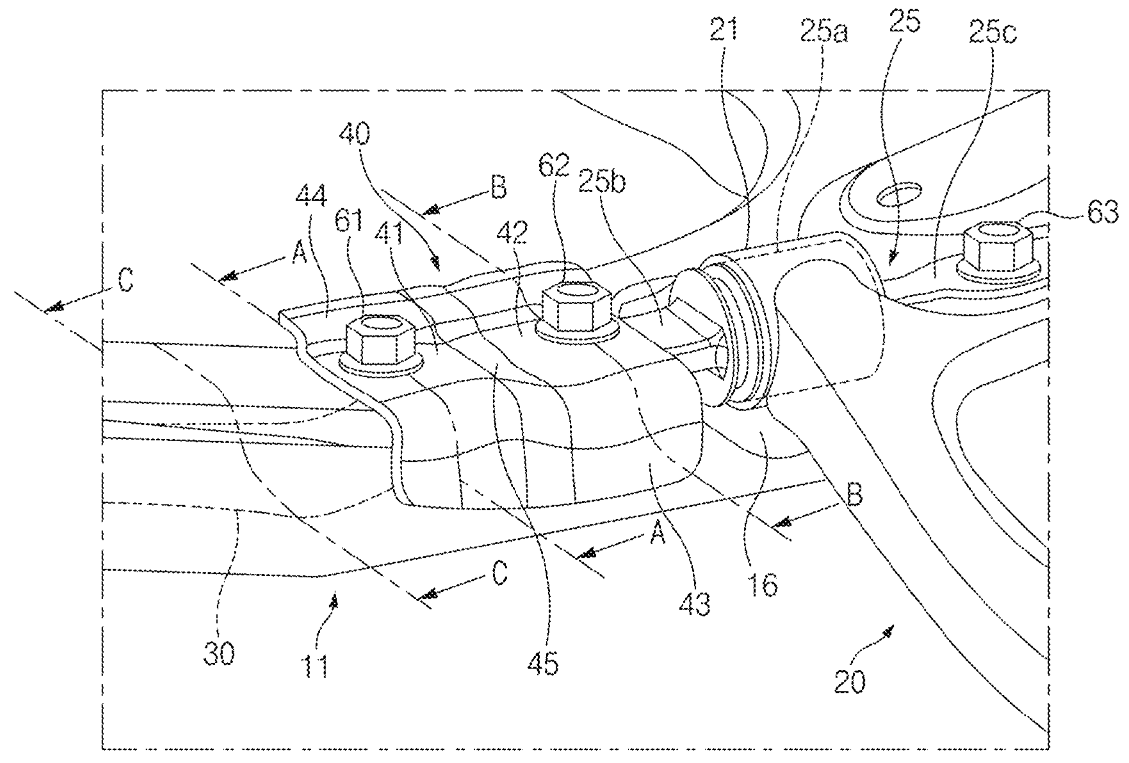
FIG. 3 illustrates a perspective view of a portion of a vehicle front subframe according to an embodiment of the present disclosure.

Referring to FIGS. 2 and 3, the first mount 21 of the suspension arm 20 may be received in the mounting recess 16 of the longitudinal member 11. The first mount 21 of the suspension arm 20 may be mounted in the mounting recess 16 of the longitudinal member 11 through a mount member 25. Referring to FIG. 3, the mount member 25 may include a cylindrical portion 25*a* that is received in the first mount 21, a front extension portion 25*b* extending from a front end of the cylindrical portion 25*a* toward the front of the vehicle, and a rear extension portion 25*c* extending from a rear end of the cylindrical portion 25*a* toward the rear of the vehicle. The front extension portion 25*b* may be fixed to the longitudinal member 11 through a fastener (for example, a bolt 62). The rear extension portion 25*c* may also be fixed to the longitudinal member 11 through a fastener (for example, a bolt 63).

Referring to FIGS. 5-8, the longitudinal member 11 may include an upper channel 11*a*, a lower channel 11*b* coupled to the upper channel 11*a*, and an inner cavity defined by the upper channel 11*a* and the lower channel 11*b*. The upper channel 11*a* may have an inverted U-shaped cross-section and the lower channel 11*b* may have a U-shaped cross-section. A bottom edge of the upper channel 11*a* may be fixed to a top edge of the lower channel 11*b* by welding and/or the like.

Referring to FIG. 3, the vehicle front subframe 10 according to an embodiment of the present disclosure may include an inner reinforcing member 30 mounted in the inner cavity of each longitudinal member 11. The inner reinforcing member 30 may be mounted on a vulnerable portion of the longitudinal member 11. The vulnerable portion of the longitudinal member 11 may have a reduced cross-section with reduced cross-sectional area compared to the other portion(s) of the longitudinal member 11. The inner reinforcing member 30 may extend to a predetermined length from a portion of the longitudinal member 11 adjacent to the mounting recess 16 of the longitudinal member 11 toward the front end of the longitudinal member 11. Accordingly, bending stiffness of the longitudinal member 11 may be improved, and buckling of the longitudinal member 11 may be significantly reduced or suppressed.

Figure 11:
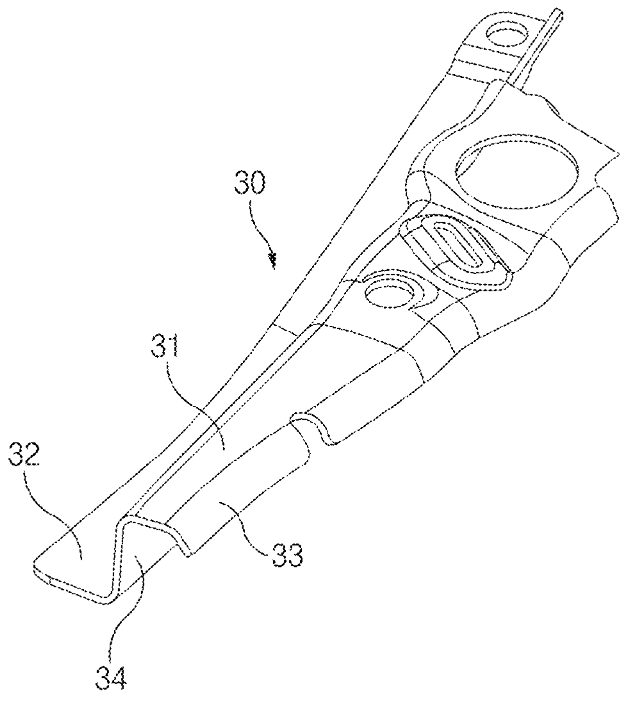
FIG. 11 illustrates a perspective view of an inner reinforcing member of a vehicle front subframe according to an embodiment of the present disclosure.
Figure 12:
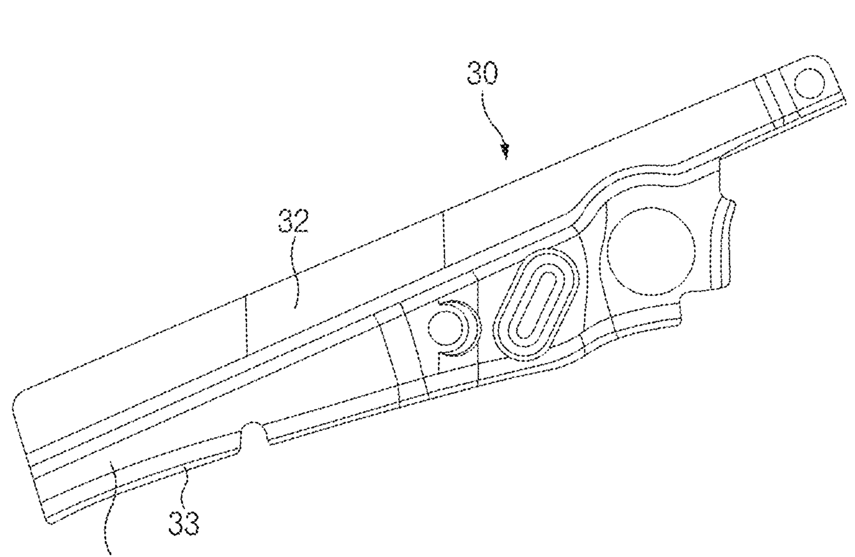
FIG. 12 illustrates a plan view of an inner reinforcing member of a vehicle front subframe according to an embodiment of the present disclosure.

Referring to FIGS. 11 and 12, the inner reinforcing member 30 may include an upper wall 31 and a lower wall 32 spaced apart from the upper wall 31. The inner reinforcing member 30 may also include a flange 33 extending along an edge of the upper wall 31 and a connection wall 34 connecting the upper wall 31 and the lower wall 32. The upper wall 31 and the lower wall 32 may be horizontally flat and the connection wall 34 may be vertically flat. The flange 33 may be bent at the edge of the upper wall 31 at a predetermined angle.

Figure 13:
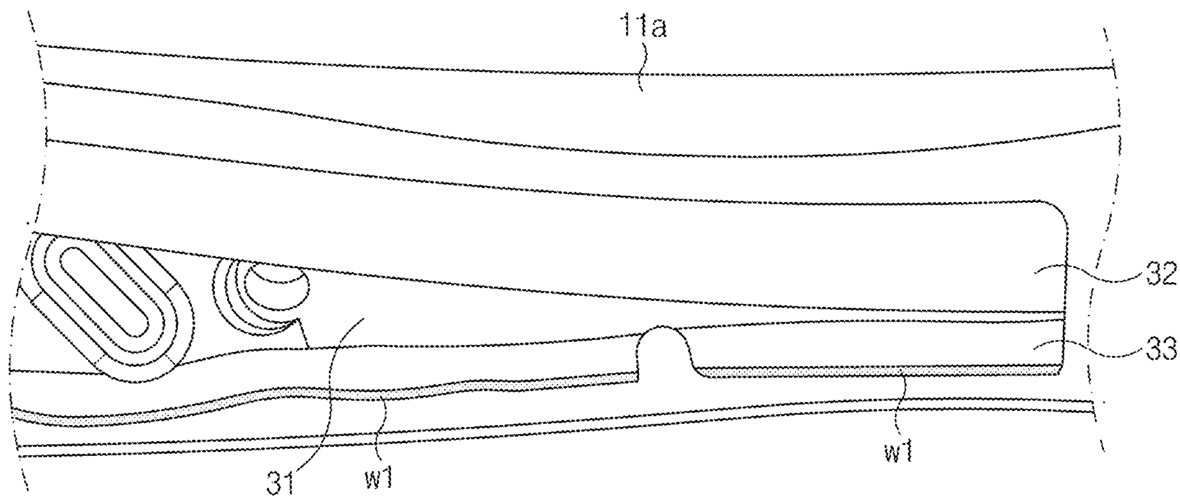
FIG. 13 illustrates a perspective view of a flange of an inner reinforcing member fixed to a lateral wall of an upper channel of a longitudinal member by welding in a vehicle front subframe according to an embodiment of the present disclosure.

Referring to FIG. 13, the flange 33 of the inner reinforcing member 30 may be fixed to one lateral wall of the upper channel 11*a* of the longitudinal member 11 through seam welding w1. In particular, the flange 33 may be welded at a position adjacent to the bottom of the lateral wall of the upper channel 11*a* so that insertion of a welding gun may be facilitated. Accordingly, welding work may be performed precisely.

Figure 8:
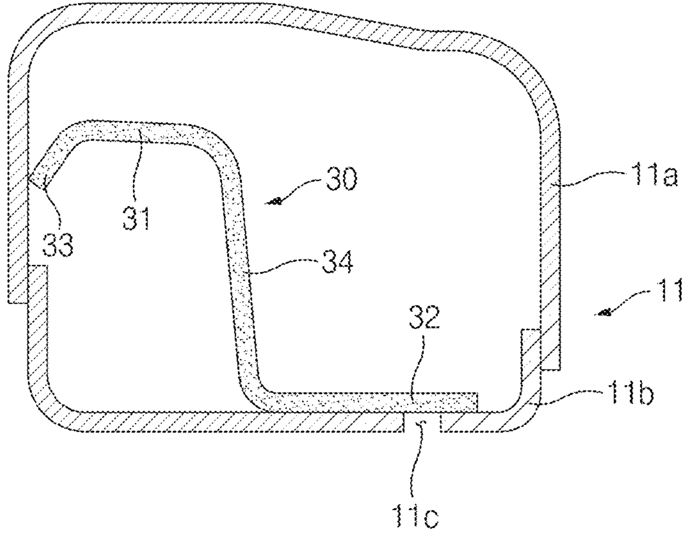
FIG. 8 illustrates a cross-sectional view, taken along line C-C of the subframe portion of FIG. 3.
Figure 14:
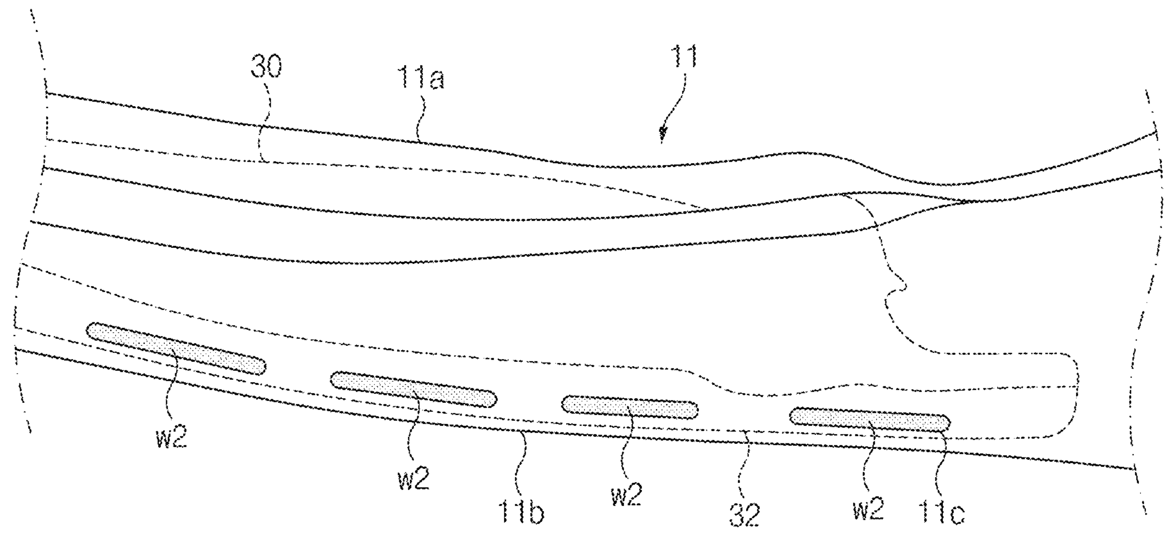
FIG. 14 illustrates a perspective view of a lower wall of an inner reinforcing member fixed to a bottom wall of a lower channel of a longitudinal member by welding in a vehicle front subframe according to an embodiment of the present disclosure.

Referring to FIG. 8, the lower channel 11*b* of the longitudinal member 11 may have a slot 11*c* formed in a bottom wall thereof. Referring to FIG. 14, by forming a plug welding w2 in the plurality of slots 11*c*, the lower wall 32 of the inner reinforcing member 30 may be fixed to the bottom wall of the lower channel 11*b* of the longitudinal member 11. Since the plurality of slots 11*c* are formed in the bottom wall of the lower channel 11*b* of the longitudinal member 11, foreign objects may be prevented from being attached to the plurality of slots 11*c*, thereby preventing any corrosion.

Specifically, the flange 33 of the inner reinforcing member 30 may be fixed to one lateral wall of the upper channel 11*a* of the longitudinal member 11 through seam welding w1. Then, the plurality of slots 11*c* may be formed in the bottom wall of the lower channel 11*b* of the longitudinal member 11 by drilling or the like. Plug welding w2 may be formed in the slots 11*c* of the lower channel 11*b* of the longitudinal member 11 so that the lower wall 32 of the inner reinforcing member 30 may be fixed to the lower channel 11*b* of the longitudinal member 11. Finally, the upper channel 11*a* may be fixed to the lower channel 11*b* by welding so that the inner reinforcing member 30 may be mounted in the inner cavity of the longitudinal member 11. The inner reinforcing member 30 may extend to a predetermined length in the inner cavity of the longitudinal member 11 so that the inner reinforcing member 30 may increase the stiffness and the moment of inertia (second moment of area) of the longitudinal member 11.

Referring to FIG. 3, the vehicle front subframe 10 according to an embodiment of the present disclosure may further include an outer reinforcing member 40 fixed to an exterior surface of the longitudinal member 11. The outer reinforcing member 40 may be located above the inner reinforcing member 30 and the outer reinforcing member 40 may be arranged to align with at least a portion of the inner reinforcing member 30. The outer reinforcing member 40 may be configured to connect the longitudinal member 11 and the mount member 25 of the suspension arm 20, thereby reducing a difference in joining stiffness between the longitudinal member 11 and the mount member 25. The outer reinforcing member 40 may be fixed to the longitudinal member 11 together with the inner reinforcing member 30 and the mount member 25 through fasteners.

Figure 4:
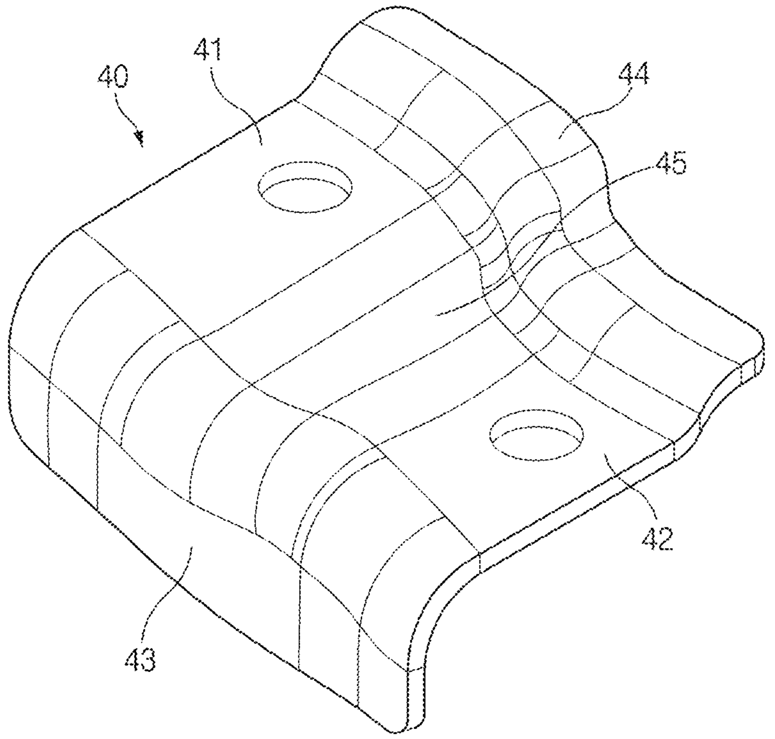
FIG. 4 illustrates a perspective view of an outer reinforcing member of the subframe portion illustrated in FIG. 3.

Referring to FIGS. 3 and 4, the outer reinforcing member 40 may include a front portion 41 and a rear portion 42 located behind the front portion 41. The front portion 41 may face the front of the longitudinal member 11 and the rear portion 42 may face the rear of the longitudinal member 11. An inclined portion 45 may connect the front portion 41 and the rear portion 42. The front portion 41, the inclined portion 45, and the rear portion 42 may be arranged along a longitudinal direction of the outer reinforcing member 40. The front portion 41 and the rear portion 42 may be formed to match the top surface of the longitudinal member 11. The inclined portion 45 may be inclined at a predetermined angle to match the shape of the longitudinal member 11.

Referring to FIGS. 3 and 4, the outer reinforcing member 40 may include a first bent portion 43 bent downward at one edge thereof and a second bent portion 44 bent upward at the other edge thereof. The first bent portion 43 may be bent downward at one edge of the outer reinforcing member 40 at a predetermined angle and a horizontal wall may be connected to the first bent portion 43. The first bent portion 43 may extend along one edge of the front portion 41, one edge of the inclined portion 45, and one edge of the rear portion 42. The second bent portion 44 may be bent upward at the other edge of the outer reinforcing member 40 at a predetermined angle. The second bent portion 44 may extend along the other edge of the front portion 41, the other edge of the inclined portion 45, and the other edge of the rear portion 42. The stiffness of the outer reinforcing member 40 may be increased by the first bent portion 43 and the second bent portion 44. Accordingly, the outer reinforcing member 40 may improve the bending stiffness and the moment of inertia (second moment of area) of the longitudinal member 11 so that the buckling of the longitudinal member 11 may be significantly reduced or suppressed.

Figure 5:
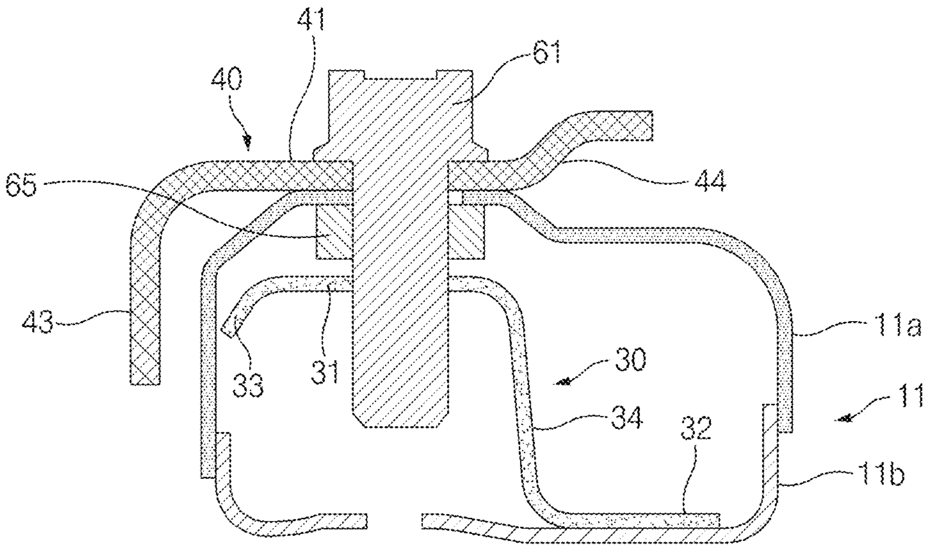
FIG. 5 illustrates a cross-sectional view, taken along line A-A of the subframe portion of FIG. 3.

Referring to FIG. 5, the front portion 41 of the outer reinforcing member 40 may be fixed to the upper channel 11*a* of the longitudinal member 11 together with the upper wall 31 of the inner reinforcing member 30 through a first front bolt 61 and a first front nut 65. The first front nut 65 may be disposed between a through hole of the upper channel 11*a* of the longitudinal member 11 and a through hole of the inner reinforcing member 30. The first front bolt 61 may extend through a through hole of the front portion 41 of the outer reinforcing member 40, the through hole of the upper channel 11*a* of the longitudinal member 11, and the through hole of the upper wall 31 of the inner reinforcing member 30. The first front bolt 61 may be screwed into the first front nut 65 so that the outer reinforcing member 40 and the inner reinforcing member 30 may be firmly fixed to the longitudinal member 11. A top surface of the first front nut 65 may directly contact the upper channel 11*a* of the longitudinal member 11. Accordingly, the first front nut 65 may be connected to the upper channel 11*a* of the longitudinal member 11.

Figure 6:
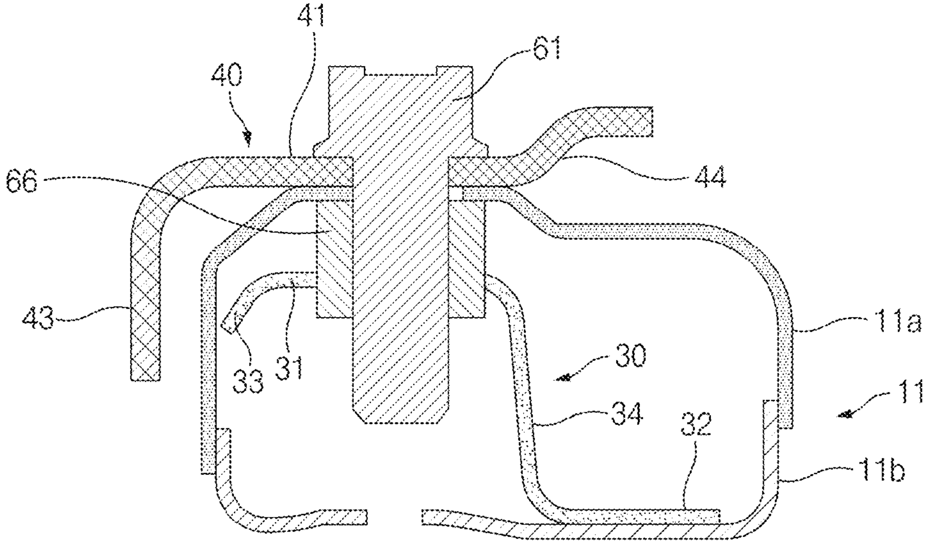
FIG. 6 illustrates a modification to the embodiment illustrated in FIG. 5.

FIG. 6 illustrates a modification to the embodiment illustrated in FIG. 5. Referring to FIG. 6, a top surface of a first front nut 66 may directly contact the upper channel 11*a* of the longitudinal member 11. A lower portion of the first front nut 66 may extend through the through hole of the upper wall 31 of the inner reinforcing member 30 so that the lower portion of the first front nut 66 may be coupled to the through hole of the upper wall 31 of the inner reinforcing member 30 by welding and/or the like. Accordingly, the first front nut 66 may be connected to the upper channel 11*a* of the longitudinal member 11 and the inner reinforcing member 30. According to the embodiment illustrated in FIG. 6, the first front nut 66 may be connected to both the upper channel 11*a* of the longitudinal member 11 and the inner reinforcing member 30. Thus, the outer reinforcing member 40 and the inner reinforcing member 30 may be more firmly joined to the upper channel 11*a* of the longitudinal member 11 through the first front bolt 61 and the first front nut 66.

Figure 7:
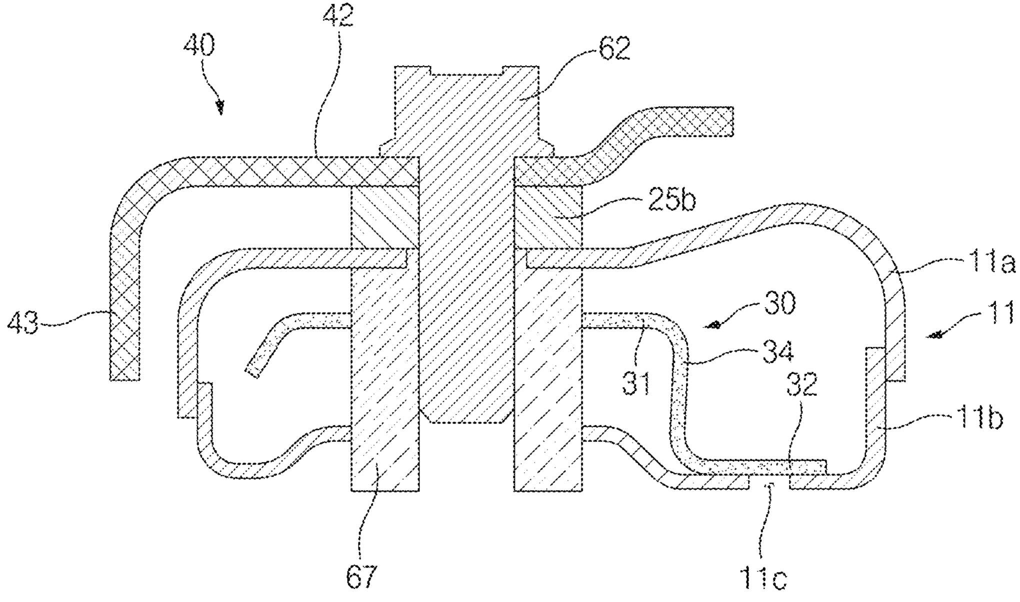
FIG. 7 illustrates a cross-sectional view, taken along line B-B of the subframe portion of FIG. 3.

Referring to FIG. 7, the front extension portion 25*b* of the mount member 25 may be interposed between the rear portion 42 of the outer reinforcing member 40 and the upper channel 11*a* of the longitudinal member 11. The rear portion 42 of the outer reinforcing member 40 may be fixed to the upper channel 11*a* of the longitudinal member 11 together with the front extension portion 25*b* of the mount member 25 and the upper wall 31 of the inner reinforcing member 30 through a second front bolt 62 and a second front nut 67. The second front nut 67 may extend through a through hole of the upper channel 11*a* of the longitudinal member 11, a through hole of the upper wall 31 of the inner reinforcing member 30, and a through hole of the lower channel 11*b* of the longitudinal member 11. The second front bolt 62 may extend through a through hole of the rear portion 42 of the outer reinforcing member 40, a through hole of the front extension portion 25*b* of the mount member 25, and the through hole of the upper channel 11*a* of the longitudinal member 11. The second front bolt 62 may be screwed into the second front nut 67 so that the rear portion 42 of the outer reinforcing member 40 and the upper wall 31 of the inner reinforcing member 30 may be firmly fixed to the longitudinal member 11 together with the front extension portion 25*b* of the mount member 25. A top surface of the second front nut 67 may directly contact the upper channel 11*a* of the longitudinal member 11. A lower portion of the second front nut 67 may extend through the through hole of the upper wall 31 of the inner reinforcing member 30 and the through hole of the lower channel 11*b* of the longitudinal member 11. Accordingly, the second front nut 67 may be connected to the upper channel 11*a* of the longitudinal member 11, the inner reinforcing member 30, and the lower channel 11*b* of the longitudinal member 11.

Figure 9:
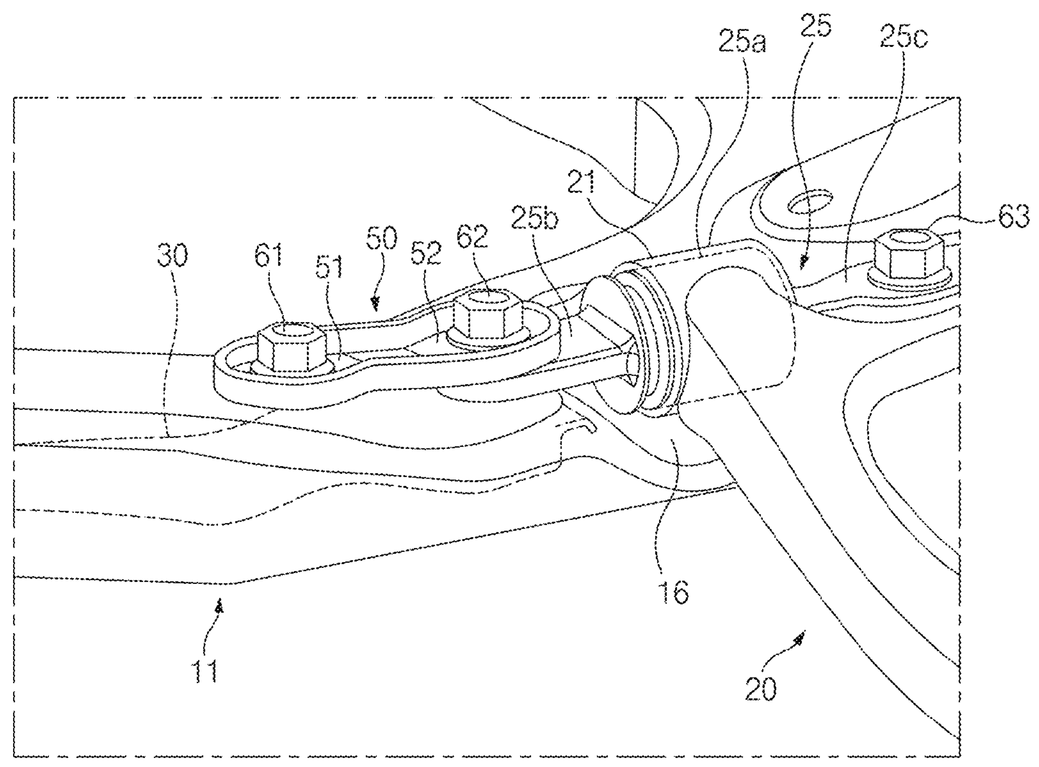
FIG. 9 illustrates a perspective view of a portion of a vehicle front subframe according to another embodiment of the present disclosure.

FIG. 9 illustrates a state in which an outer reinforcing member 50 is mounted on the longitudinal member 11 together with the inner reinforcing member 30 and the mount member 25 of the suspension arm 20 in a front subframe according to another embodiment of the present disclosure. The outer reinforcing member 50, as illustrated in FIGS. 9 and 10, may have a compact size compared to the size of the outer reinforcing member 40 illustrated in FIGS. 3 and 4.

Figure 10:
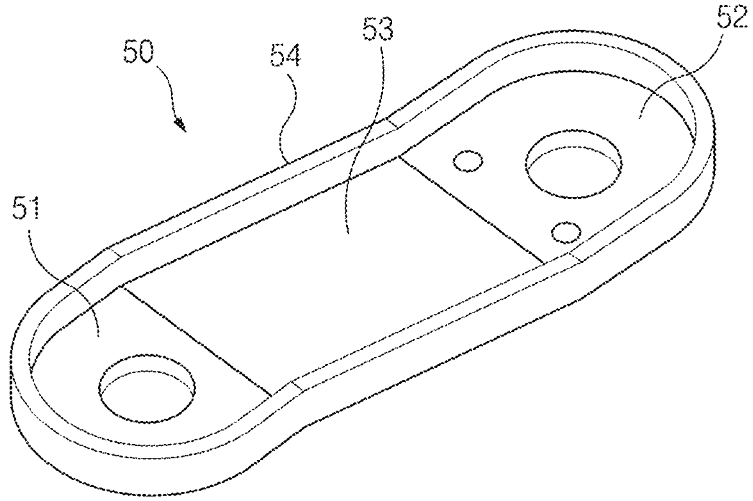
FIG. 10 illustrates a perspective view of an outer reinforcing member of the subframe portion illustrated in FIG. 9.

Referring to FIG. 10, the outer reinforcing member 50 may include a front portion 51 facing the front of the vehicle, a rear portion 52 facing the rear of the vehicle, and an inclined portion 53 connecting the front portion 51 and the rear portion 52. The inclined portion 53 may be inclined at a predetermined angle to match the shape of the longitudinal member 11. The outer reinforcing member 50 may have a bent portion 54 extending along an edge thereof. The stiffness of the outer reinforcing member 50 may be increased by the bent portion 54. Accordingly, the outer reinforcing member 50 may improve the bending stiffness and the moment of inertia (second moment of area) of the longitudinal member 11 so that the buckling of the longitudinal member 11 may be significantly reduced or suppressed.

As set forth above, the front subframe according to embodiments of the present disclosure may be designed to suppress the buckling of the front subframe in the event of a frontal impact/collision, thereby effectively transferring impact energy to the rear mounts of the front subframe. Thus, the front subframe may be easily separated from the vehicle body.

According to embodiments of the present disclosure, the inner reinforcing member may be mounted in the inner cavity of the longitudinal member so that the bending stiffness of the longitudinal member may be improved. As a result, the buckling of the longitudinal member may be significantly reduced or suppressed.

According to embodiments of the present disclosure, the outer reinforcing member may be located above the inner reinforcing member and be arranged to align with the inner reinforcing member. The outer reinforcing member may be configured to connect the longitudinal member and the mount member of the suspension arm, thereby reducing a difference in joining stiffness between the longitudinal member and the mount member.

Hereinabove, although the present disclosure has been described with reference to embodiments and the accompanying drawings, the present disclosure is not limited thereto. However, the embodiments of the present disclosure may be variously modified and altered by those having ordinary skill in the art to which the present disclosure pertains without departing from the spirit and scope of the present disclosure claimed in the following claims.

What is claimed is:

1. A vehicle front subframe, comprising:

a pair of longitudinal members each extending in a longitudinal direction of a vehicle and having a mounting recess;

an inner reinforcing member mounted in an inner cavity of each longitudinal member; and a suspension arm having a mount mounted in the mounting recess of each longitudinal member through a mount member, wherein the inner reinforcing member includes an upper wall, a lower wall spaced apart from the upper wall, a flange extending along an edge of the upper wall, and a connection wall connecting the upper wall and the lower wall.

2. The vehicle front subframe according to claim 1, wherein the inner reinforcing member extends from the mounting recess toward a front of the longitudinal member, and wherein the inner reinforcing member is fixed to the longitudinal member together with the mount member through a fastener.

3. The vehicle front subframe according to claim 1, wherein the longitudinal member includes an upper channel and a lower channel coupled to the upper channel, and wherein the inner cavity is defined by the upper channel and the lower channel.

4. The vehicle front subframe according to claim 3, wherein the flange is fixed to a lateral wall of the upper channel by welding, and wherein the lower wall is fixed to a bottom wall of the lower channel by welding.

5. The vehicle front subframe according to claim 1, further comprising an outer reinforcing member fixed to an exterior surface of the longitudinal member and aligned with at least a portion of the inner reinforcing member.

6. The vehicle front subframe according to claim 5, wherein the outer reinforcing member is configured to connect the longitudinal member and the mount member.

7. The vehicle front subframe according to claim 5, wherein the outer reinforcing member includes a front portion and a rear portion located behind the front portion.

8. The vehicle front subframe according to claim 5, wherein the outer reinforcing member has a bent portion bent at at least one edge thereof.

9. The vehicle front subframe according to claim 7, wherein the front portion of the outer reinforcing member is fixed to the longitudinal member together with the inner reinforcing member through a first front bolt and a first front nut.

10. The vehicle front subframe according to claim 9, wherein a top surface of the first front nut contacts the longitudinal member.

11. The vehicle front subframe according to claim 9, wherein a top surface of the first front nut contacts an upper portion of the longitudinal member, and wherein a lower portion of the first front nut extends through a through hole of the inner reinforcing member.

12. The vehicle front subframe according to claim 9, wherein the rear portion of the outer reinforcing member is fixed to the longitudinal member together with the mount member and the inner reinforcing member through a second front bolt and a second front nut.

13. The vehicle front subframe according to claim 12, wherein a top surface of the second front nut contacts an upper portion of the longitudinal member, and wherein a lower portion of the second front nut extends through a through hole of the inner reinforcing member and a through hole of a bottom of the longitudinal member.

* * * * *